Figure 1:
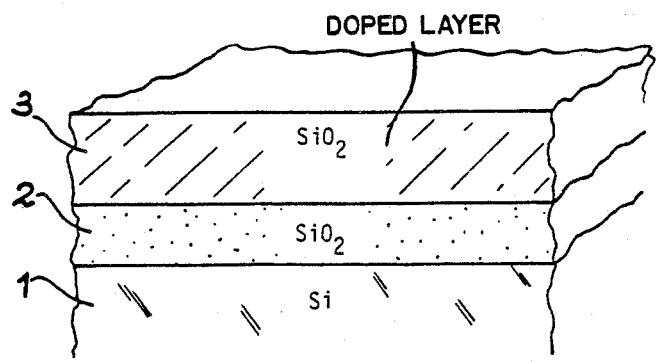

United States Patent [19]

Valette

[11] Patent Number: 4,929,302
[45] Date of Patent: May 29, 1990

[54] PROCESS FOR THE PRODUCTION OF LIGHT MICROGUIDES WITH LOW OPTICAL PROPAGATION LOSSES BY MULTICOATING DEPOSITION

[75] Inventor: Serge Valette, Grenoble, France

[73] Assignee: Commissariat a l'Energie Atomique, Paris, France

[21] Appl. No.: 287,076

[22] Filed: Dec. 20, 1988

[30] Foreign Application Priority Data

Dec. 24, 1987 [FR] France .............................. 87 18155

[51] Int. Cl.$^5$ ...................... H01L 21/306; B44C 1/22; C03C 15/00; C03C 25/06
[52] U.S. Cl. ................................ 156/657; 156/659.1; 156/662; 204/192.23; 204/192.26; 204/192.28; 350/96.12; 427/167; 437/240
[58] Field of Search .............. 156/643, 646, 653, 657, 156/659.1, 662, 649; 350/96.12, 96.3, 96.33; 357/17; 437/23, 238, 240; 65/3.11; 427/162, 167; 204/192.23, 192.26, 192.28

[56] References Cited

FOREIGN PATENT DOCUMENTS 2066805 7/1981 United Kingdom .

OTHER PUBLICATIONS

Patent Abstracts of Japan, vol. 11, No. 87, p. 557, 2534, 17.3.1987; JP-A-61 240 207 (NEC Corp.) 25.10.1986.

*Primary Examiner*—William A. Powell
*Attorney, Agent, or Firm*—Nutter, McClennen & Fish

[57] ABSTRACT

Process for the production of light microguides with low optical propagation losses by multilayer deposition comprises, deposited in this order on a substrate, a first layer of index n, a second guide layer of index $n+\Delta n_1$ and a third layer covering the two first-mentioned layers and of index $n+\Delta n_2$. The second guide layer is deposited in two successive stages comprising: a first deposition stage followed by a partial etching of a first intermediate layer through an appropriate mask, in such a way that the unmasked part of the first intermediate layer has a thickness, counted from the interface located between the first layer and the first intermediate layer, equal to h, and a second deposition stage of a second intermediate layer of a material having the same index $n+\Delta n_1$ as the preceding intermediate layer and surmounting the latter by a height h'.

6 Claims, 4 Drawing Sheets

PROCESS FOR THE PRODUCTION OF LIGHT MICROGUIDES WITH LOW OPTICAL PROPAGATION LOSSES BY MULTICOATING DEPOSITION

DESCRIPTION

The present invention relates to light microguides, which are structures in which the electromagnetic energy is confined and flows in accordance with modes inherent in the electromagnetic field and which are dependent both on the dimensions and the refractive indexes of the microguide and the wavelength of the electromagnetic radiation carried. Obviously the term light guide is not limited to visible light and can also extend to infrared or ultraviolet radiation.

The main quality of a light microguide is to function with minimum optical losses, in other words, to restore at the outlet an electromagnetic energy which is as close as possible to that injected at the inlet.

Among the microguides, the present invention more particularly relates to those produced by the deposition of multiple coatings or layers. These microguides have at least three superimposed layers of materials, whereof one (the central layer in the case of three layers) has a refractive index higher than the two others, said layer being referred to in the remainder of the text as the guide layer. These different layers are produced in known manner, e.g. with the aid of plasma-assisted chemical vapor deposition (PECVD), particularly in the case of $SiO_2$, or other vapor chemical deposition processes, such as flame hydrolysis and low pressure chemical vapor deposition (LPCVD), particularly in the case of silicon nitride $Si_3N_4$. The invention also relates to the multilayer structures obtained by cathodic sputtering or vacuum evaporation.

Moreover, in general terms, when the layers have the same basic constituent, e.g. silica, in order to have a refractive index difference, doping takes place of one, several, or all the layers using known methods and among which reference can be made to the use of chemical reactions in the presence of reactive gases, ion implantation and the diffusion of ions or various atoms.

For an understanding of the invention, a description will firstly be given of conventional light microguide production processes taking as an example a microguide produced from $SiO_2$ and reference will be made hereinafter to the defects of such microguides and which can be obviated by the process according to the invention. The description of the prior art in the field of microguides is provided with reference to FIGS. 1 to 5, which represent different successive stages in such a known production.

FIG. 1 diagrammatically shows an e.g. silicon substrate 1, on which are deposited, also in known manner, two successive silica layers, namely e.g. a first natural silica layer 2 and a second doped silica layer 3. The latter must have a refractive index higher than the former, layer 3 being doped by a dopant making it possible to increase the index of the silica and e.g. constituted by phosphorus, germanium or titanium. Moreover, the silicon substrate 1 can be replaced by a glass or silica substrate, or a substrate of any material on which these deposits can be made.

Figure 2:
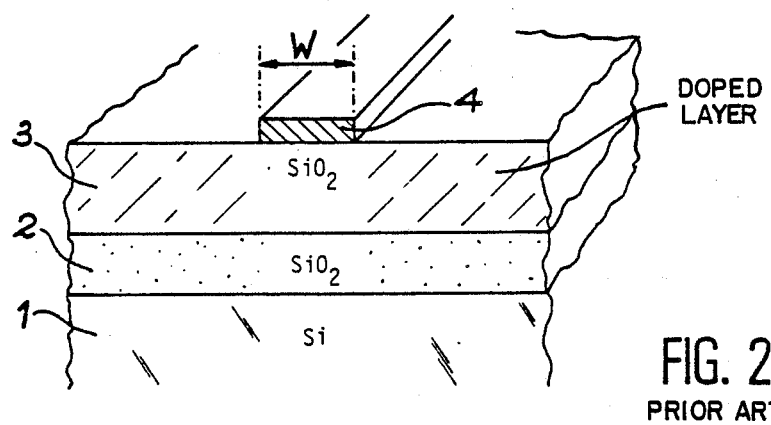

The following known stage of the production of the microguide can be seen in FIG. 2, where it is possible to see the aforementioned layers 1, 2 and 3 and where an illustration is provided of the realization of a protective mask 4 in the form of a strip of width W on the surface of the silica layer 3 and permitting the subsequent etching of the latter. The material constituting this mask can, in particular, be of photosensitive resin or metal.

Figure 3:
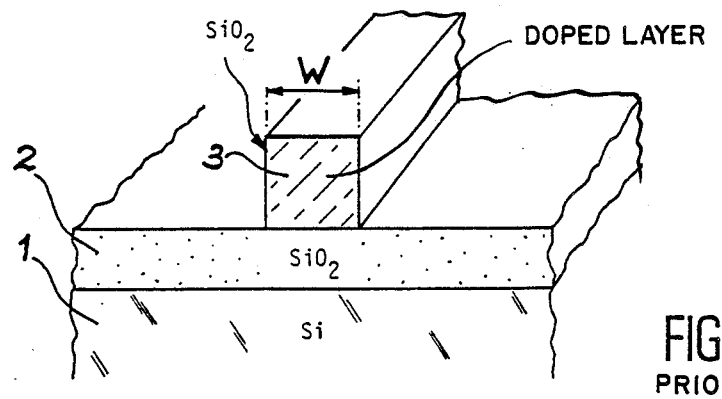

The following stage shown in FIG. 3 consists of etching the $SiO_2$ layer 3 doped through the protective mask 4, which leads to the actual guide layer of the microguide in the form of a rectangular doped silica bar 3, after which the mask is eliminated.

Figure 4:
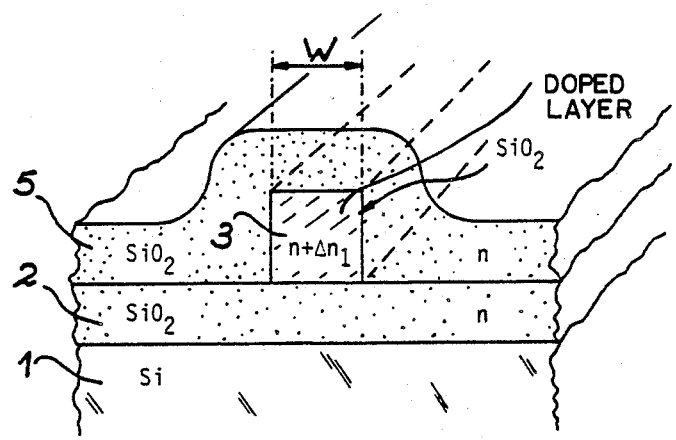

In FIGS. 1, 2 and 3, layer 2 has a refractive index n and layer 3 an index n+n. In FIG. 4 is shown the final stage of production, which consists of covering the complete structure of FIG. 3 with a silica layer 5 of refractive index $n + \Delta n_2$, with $\Delta n_2 < n_1$, or refractive index $n - n_2$, with in this case $\Delta n_2 < \Delta n_1$ or $\Delta n_2 \Delta n_1$. Usually the silica layers 2 and 5 have the same index n and microguide 3 the refractive index $n + \Delta n_1$. The essential point is that with layer 3 effectively serving as a guide layer, it has a refractive index higher than that of layer 2 and that of layer 5, so as to bring about the sought trapping of the electromagnetic light wave. In other words, layers 2 and 5 can be undoped silica layers or, if they are doped silica layers, they must be doped more weakly than layer 3 constituting the microguide. Layers 2 and 5 could also be silica layers doped by dopants, such as boron or fluorine, making it possible to reduce the refractive index of the silica and in this case layer 3 could be of natural silica. The thus produced known light microguides have optical propagation losses with an intensity which varies in accordance with their constitution, but often too high for certain applications. In particular, the losses of such microguides increase very considerably when the width W of the guide layer 3 decreases and when the index variation $\Delta n_1$ between the guide layer and adjacent layers is a few $10^{-3}$, the losses increase very rapidly when W is equal to or below a value of 5 to 6 micrometers. The reason for this significant increase of the losses is known and has the two following main causes. On the one hand, the processes for etching the guide layer lead to surface defects of layers 2 and 3, which can vary as a function of the etching methods used (ionic etching, reactive ionic etching, chemical etching, etc.), as well as according to the etching conditions (nature of the gases used during reactive ionic etching, nature of the chemical etching solution used during chemical etching) and as a function of the types of protective materials used for producing mask 4. On the other hand, the reduction in the size W of the guide layer 3 leads to an evolution of the operation of the system towards a guided mode, whereof the number of total reflections in the guide layer increases. There are consequently more interactions with the surface defects referred to hereinbefore and consequently a relative increase in the optical losses.

Figure 5:
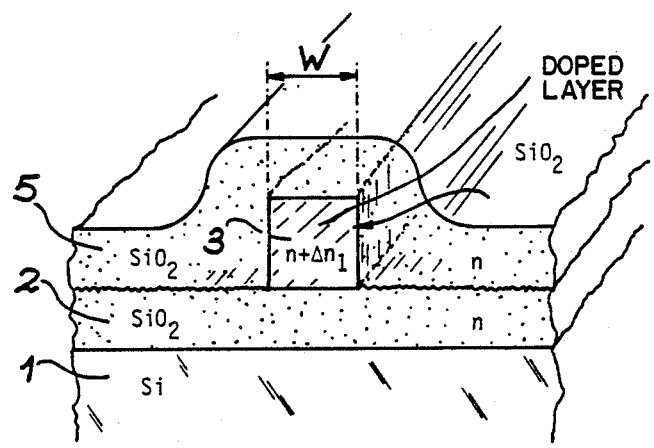

In order to illustrate the surface defects of the prior art referred to hereinbefore, reference should be made to FIG. 5, which shows the same structure as that of FIG. 4, but where undulations distributed over the lateral surfaces of the guide layer 3 and the interface between layers 2 and 5, reveal the junction irregularities between said different layers and which represents the end result obtained with the processes described hereinbefore.

The present invention specifically relates to a process for the production of light microguides with a lower optical propagation loss by multilayer deposition and which makes it possible, by a simple and effective method, to minimize the importance of the consequences of the aforementioned etching defects represented in FIG. 5.

Thus, the present invention relates to a process for the production of light microguides with low optical propagation losses by multilayer deposition comprising, deposited in this order on a substrate, a first layer of index n, a second guide layer of index $n+\Delta n_1$ and a third layer covering the two aforementioned layers of index $n+\Delta n_2$, with $\Delta n_2 < \Delta n_1$ or $n-n_2$, characterized in that the second guide layer is deposited in two successive stages involving a first deposition stage followed by a partial etching of a first intermediate layer through an appropriate mask, in order that the unmasked part of the first intermediate layer has a thickness, countered from the interface located between the first layer and the first intermediate layer, equal to h and compatible with the accuracy of the etching so as not to reach the interface between the first layer and the second layer, a second stage of depositing a second intermediate layer of a material having the same index $n+\Delta n_1$ as the first preceding intermediate layer and surmounting the same by a height h' adequate not to reproduce the etching defects of said preceding intermediate layer, the total thickness h+h' of the etched part of the second layer having to be compatible with the operation of the microguide. In other words, the thickness h+h' must be relatively small in order that the light energy possibly guided in said region cannot propagate. This means that the thickness h+h' is either less than the cutoff thickness associated with the thus formed planar guide, or that the evanescent wave associated with the guided mode of said planar guide can be absorbed by the substrate if the latter is not transparent to the working wavelength or is absorbed by an absorbent (metallic) layer intentionally deposited on the finished structure above layer 5.

Thus, the processing according to the invention is essentially based on the production of the second guide layer 3 in two successive stages corresponding to two superimposed intermediate layers of the same index, which are identifiable and separated by the etching defects which it is wished to minimize (except obviously on the masked part of layer 3a).

According to the invention, the first etching stage of layer 3 is that of the first intermediate layer 3a, which is stopped at a height h above the surface of layer 2, the etched surface of said intermediate layer 3a having the same defects as the prior art layers 2 and 3.

According to the invention, it is possible to overcome the aforementioned surface defects by depositing on the intermediate layer 3a a second intermediate layer 3b of a material having the same index $n+n_1$ as the intermediate layer 3a. This second intermediate layer 3b is doped by an adequate thickness h' to absorb, without reproducing them, the etching defects located at the interface of the intermediate layers 3a and 3b, the thickness h+h' being sufficiently small to be compatible with the operation of the microguide. Finally, the aforementioned assembly is covered by a layer 5 having a refractive index below that of the intermediate layers 3a and 3b, as was the case with layer 5 in the prior art described in FIGS. 1 to 5.

Figure 6:
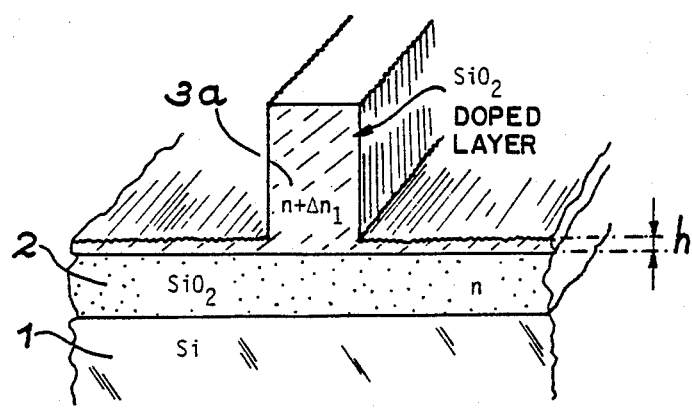
Figure 7:
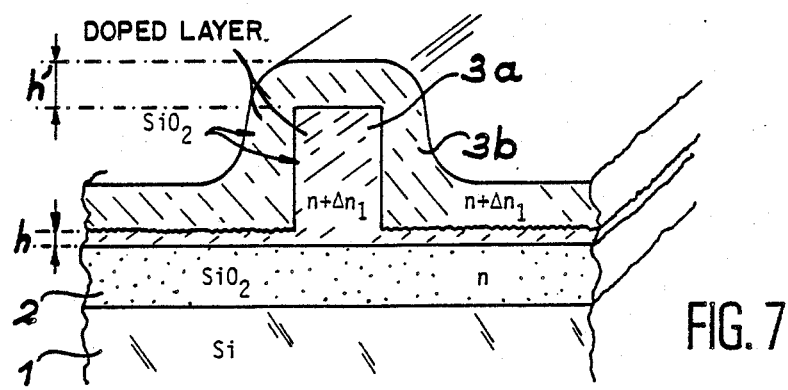
Figure 8:
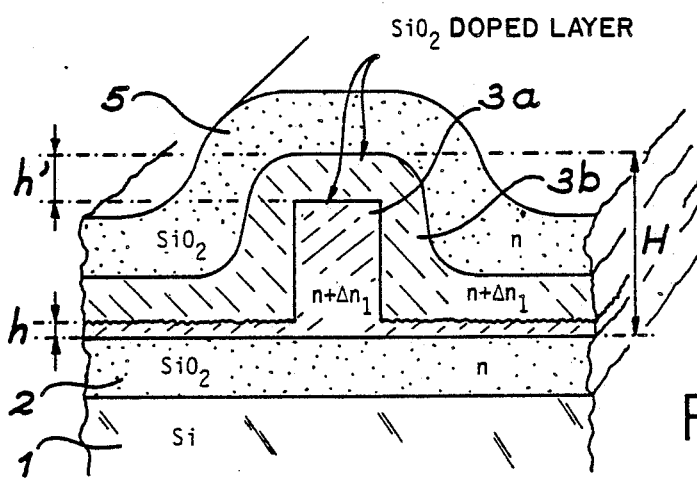
Figure 9:
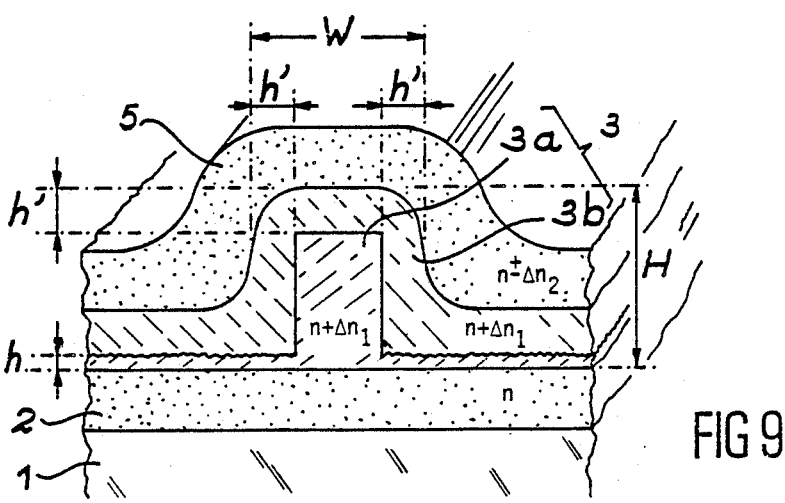
Figure 10:
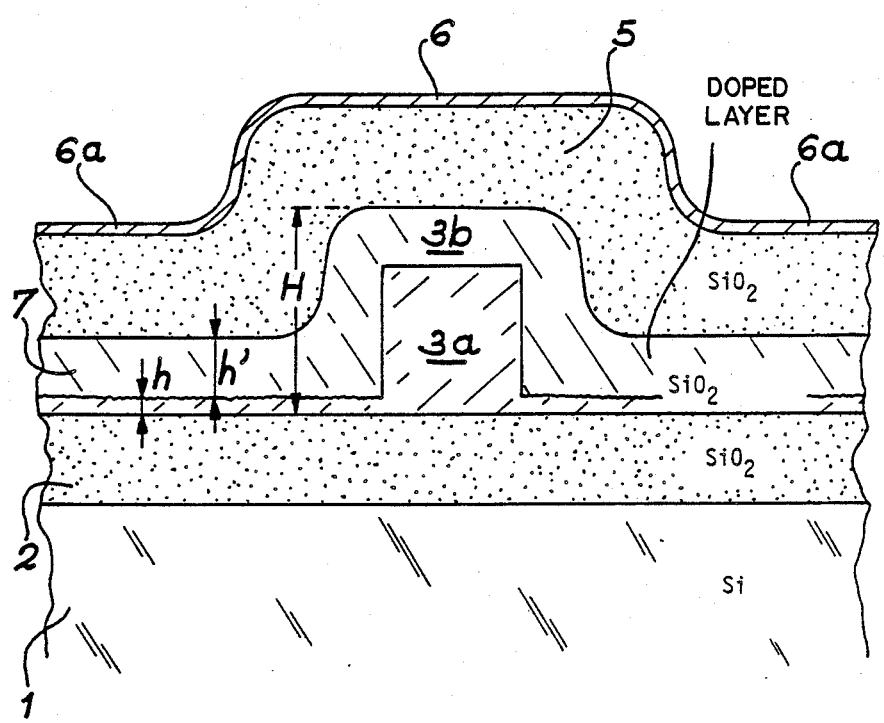

The invention is described in greater detail hereinafter relative to a non-limitative embodiment of the microguide production process according to the invention and relative to the attached drawing which show:

FIGS. 1 to 5, to 5, already described, the different successive steps in the making of a known microguide;

FIG. 6 the deposition of the first doped intermediate layer of the light microguide;

FIG. 7 the deposition of the second intermediate layer of the light microguide;

FIG. 8 the deposition of the third light microguide covering layer 5;

FIG. 9 the application of the process according to the invention to the production of a guide layer of width W and height H;

FIG. 10 the deposition of a supplementary metallic absorbent layer with respect to the structures of FIGS. 8 and 9.

In the embodiment described with reference to FIGS. 6 to 9, substrate 1 is e.g. of silicon and layers 2, 3a, 3b and 5 of silica $SiO_2$, layers 2 and 5 having an index n and intermediate layers 3a and 3b an index $n+\Delta n_1$. This is obviously a particularly interesting case of the realization of the present invention, but as will be shown hereinafter, other triads of materials or dopings can also be used as a function of the particular application cases of the invention.

FIG. 6 shows the silicon substrate 1 on which are successively deposited the first silica layer 2 of index n and the first intermediate layer 3a of index $n+\Delta n_1$. Layer 3a has been partly etched by any known means through an appropriate mask. The remaining thickness of the etched part of layer 3a, counting from the interface between layer 2 and layer 3a is equal to h. In the particular case described, the value of h can e.g. be between 0.1 and 0.5 micrometer. The essence is that one is sure not to reach the interface between layers 2 and 3a during the preceding etching. Bearing in mind the inhomogeneities of depositions, the accuracy of this type of etching is approximately 5% of the thickness of layer 3a, so that it is possible to choose for h a value equal to 0.25 micrometer when the thickness of the first intermediate layer 3a is equal to 5 micrometer.

FIG. 6 diagrammatically represents by means of graphic undulations the inevitable surface defects existing at this stage on the etched regions of the first layer 3a.

FIG. 7 then shows the second stage of depositing a material of the same index as that of the first layer 3a and which covers the latter by a height h'. In the described example, said second intermediate layer 3b is made, like the first intermediate layer 3a, of silica $SiO_2$, which is doped and has an index $n+\Delta n_1$. The choice of the thickness h' results from a compromise between two opposing requirements, namely the need for h' to be adequate to absorb and cancel out surface defects of the first intermediate layer 3a and the need for h+h' not to be too high in order to be compatible with the operation of microguide 3. In the present case, thickness h' is between 0.5 and 2 micrometer and $\Delta n_1$ is approximately $5.10^{-3}$. The height h of the etched part of the first intermediate layer 3a is approximately 5% of the thickness of the first intermediate layer 3a.

Finally, FIG. 8 represents the last stage of production consisting of a final deposit of a silica layer 5 of the same type as that described relative to FIG. 4, whose thickness is generally a few micrometer, the main requirement with respect thereto resulting from the need that it is thicker than the depth of the evanescent wave associated with the guided mode. On referring now to FIG. 9, a description will be given of the practical requirements for the realization of the process according to the invention, when it is wished to produce a guide layer, whereof the dimensions are W for the width and H for the height. As can be gathered from FIG. 9, the necessary operations comprise:

(a) depositing on the first layer 2 of refractive index n, an intermediate layer 3a of index $n+\Delta n_1$ and thickness $H-h'$;

(b) partly etching the first intermediate layer 3a of a material of index $n+\Delta n_1$ in the form of a pattern of width $W-2h'$ until the etched portion has a thickness h;

(c) depositing the second intermediate layer 3b of a material with the same refractive index as that of layer 3a and of general thickness h';

(d) completing the assembly of the preceding deposits by a layer of material with a refractive index $n+\Delta n_2$ below that of layers 3a and 3b above the second intermediate layer 3b.

According to the invention, the materials constituting these three layers 2, 3 and 5 can be chosen from the following triads:

$SiO_2$, doped$^+$ $SiO_2 SiO_2$; doped$^-$ $SiO_2$, $SiO_2$, dopend$^-$ $SiO_2$;

$SiO_2$, $Si_3N_4$, $SiO_2$;

$SiO_2$, Zno, $SiO_2$;

$SiO_2$, Zno, $SiO_2$;

$SiO_2$, $Si_3N_4$, $Al_2O_3$;

$SiO_2$, SiON, $SiO_2$.

In these examples, the intermediate layers 3a and 3b of layer 3 are of the same nature.

Moreover, the term "doped$^+$" is understood to mean a doping leading to an increase in the refractive index of the basic material and "doped$^-$" a doping leading to a decrease in the refractive index of the basic material.

When the material constituting the guide layer is silicon nitride $Si_3N_4$ or zinc oxide AnO, inserted between two silica layers, it is advantageous to choose for the height H of the guide layer a value between 0.05 and 0.2 micrometer, a thickness h between 0.02 and 0.08 $\mu$m, the index difference $\Delta n_1$ being close to 0.55.

Among the advantages of the production process according to the invention, note should be taken of the following:

(a) the significance of the etching defects of the first intermediate layer 3a and which are obviously inevitable is decreased, because at the interface between intermediate layers 3a and 3b, the refractive index variation is zero, because the two intermediate layers have the same refractive index;

(b) the guide layer 3 has rounded angles and a guided mode profile closer to that of monomode optical fibers with circular symmetry, which permits an easier coupling between the microguides obtained by the process according to the invention and the preceding monomode optical fibers;

(c) for a given height H of the guide layer, the depth of the etching to be carried out is only $H-h-h'$, instead of H corresponding to the etching depth necessary in the prior art methods, which leads to a by no means negligible time saving and to a reduced pollution of the frame.

According to a preferred embodiment of the invention, the light guide layer is given a width W substantially equal to its height H, which is a particularly appropriate choice in the case where light guides are used in coupled form with optical fibers.

FIG. 10 shows the use of a complimentary absorbent layer 6, e.g. a metallic layer, to prevent propagation of parasitic light outside the microguide (whereof the guide layer is of thickness H) in the planar guide of thickness $h+h'$. The thickness of such a layer is linked with the invention, to the extent that in the prior art $h+h'32$ 0 and consequently the light cannot propagate in the planar guide, which consequently does not exist. The e.g. metallic absorbent layer 6 can be limited to the regions 6a located to the left and right of FIG. 10, above the planar guide 7 of thickness $h+h'$, or may not be limited at all and is then continuous. In the latter case, it is obviously assumed that the thickness of the $SiO_2$ layer 5 overhanging the guide layer 3 is adequate to ensure that the light guided in said guide layer 3 is not absorbed in the absorbent layer 6.

I claim:

1. A process for the production of light microguides with low optical propagation losses by multilayer deposition comprising, deposited in this order on a substrate (1), a first layer (2) of index n, a second guide layer (3) of index $n+\Delta n_1$ and a third layer (5) covering the two aforementioned layers of index $n+\Delta n_2$, with $\Delta n_2 < \Delta n_1$ or $n-\Delta n_2$, characterized in that the second guide layer (3) is deposited in two successive stages involving a first deposition stage followed by a partial etching of a first intermediate layer (3a) through an appropriate mask, in order that the unmasked part of the first intermediate layer has a thickness, countered from the interface located between the first layer and the first intermediate layer equal to h and compatible with the accuracy of the etching so as not to reach the interface between the first layer (2) and the second layer (3), a second stage of depositing a second intermediate layer (3b) of a material having the same index $n+\Delta n_1$ as the first preceding intermediate layer (3a) and surmounting the same by a height h' adequate not to reproduce the etching defects of said preceding intermediate layer (3a), the total thickness $h+h'$ of the etched part of the second layer having to be compatible with the operation of the microguide.

2. The process for the production of light microguides according to claim 1, characterized in that the substrate (1) is of silicon and the three layers (2,3,5) of silica, the first (2) and third (5) layers having the same index n and the second guide layer (3) being doped and having the index $n+\Delta n_1$, with $\Delta n_1$ being approximately $5.10^{-3}$, h being approximately 5% of the thickness of the first intermediate layer (3a) and h' being between 0.5 and 2 $\mu$m.

3. The process for production of light microguides according to claim 1, characterized in that the materials constituting the three layers (2,3,5) are chosen among the following triads of materials:

$SiO_2$, doped$^+_2$ $SiO_2$, $SiO_2$;

doped$^-$ $SiO_2$, $SiO_2$, doped$^-$ $SiO_2$;

$SiO_2 Si_3N_4 SiO_2$;

$SiO_2$, ZnO, $SiO_2$;

$SiO_2$, $Si_3N_4$, $Al_2O_3$;

$SiO_2$, SiON, $SiO_2$.

4. The process for the production of light microguides according to claim 1, characterized in that the light guide layer has a width W substantially equal to its height H.

5. The process for the production of light microguides according to claim 3, characterized in that the material of the guide layer (3) is chosen from among silicon nitride $Si_3N_4$ or zinc oxide ZnO, the height H of the guide layer (3) being between 0.05 and 0.2 µm and the thickness h between 0.02 and 0.08 µm.

6. The process for the production of light microguides according to claim 1, characterized in that the structure is completed by the deposition of an absorbent layer (6) on the third covering layer (5).

* * * * *